Patented July 9, 1946

2,403,790

UNITED STATES PATENT OFFICE 2,403,790

METHOD OF PREPARING A DIAZINE DERIVATIVE

Gaetano F. D'Alelio and James W. Underwood, Pittsfield, Mass., assignors to General Electric Company, a corporation of New York No Drawing. Application September 1, 1942, Serial No. 456,929

1 Claim. (Cl. 260—251)

This invention relates to the preparation of diazine derivatives which are embraced by the following general formula:

I

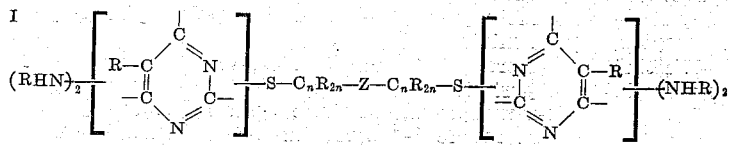

In the above formula $n$ represents an integer and is at least 1 and not more than 2, R represents a member of the class consisting of hydrogen and monovalent hydrocarbon and substituted hydrocarbon radicals, more particularly halo-hydrocarbon radicals, and Z represents a member of the class consisting of oxygen and sulfur. More particularly the invention is concerned with certain new and useful improvements in a method of preparing beta,beta'-bis-(4,6-diamino pyrimidyl-2 thio) diethyl ether.

Illustrative examples of radicals that R in Formula I may represent are: aliphatic (e. g., methyl, ethyl, propyl, isopropyl, butyl, secondary butyl, isobutyl, butenyl, amyl, isoamyl, hexyl, etc.), including cycloaliphatic (e. g., cyclopentyl, cyclopentenyl, cyclohexyl, cyclohexenyl, cycloheptyl, etc.); aryl (e. g., phenyl, diphenyl or xenyl, naphthyl, etc.); aliphatic-substituted aryl (e. g., tolyl, xylyl, ethylphenyl, propylphenyl, isopropylphenyl, allylphenyl, 2-butenylphenyl, tertiary-butylphenyl, etc.); aryl-substituted aliphatic (e. g., benzyl, cinnamyl, phenylethyl, phenylpropyl, etc.); and their homologues, as well as those groups with one or more of their hydrogen atoms substituted by, for example, a halogen, more particularly chlorine, bromine, fluorine or iodine. Specific examples of halogeno-substituted hydrocarbon radicals that R in the above formula may represent are: chloromethyl, chloroethyl, chlorophenyl, dichlorophenyl, ethyl chlorophenyl, chlorocyclohexyl, phenyl chloroethyl, bromoethyl, bromopropyl, fluorophenyl, iodophenyl, bromotolyl, etc. Preferably R is hydrogen. However, there also may be produced in accordance with the present invention compounds such, for instance, as those represented by the general formulas:

II

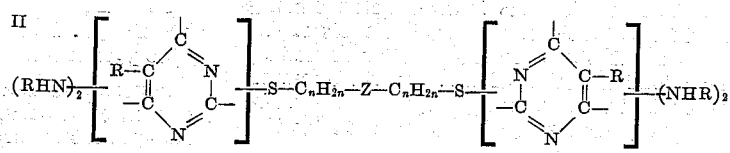

and, more particularly,

III

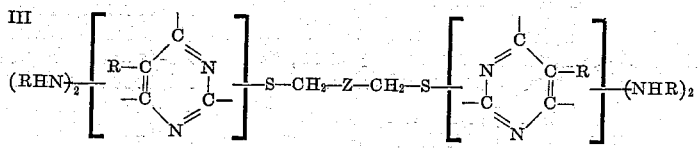

and

IV

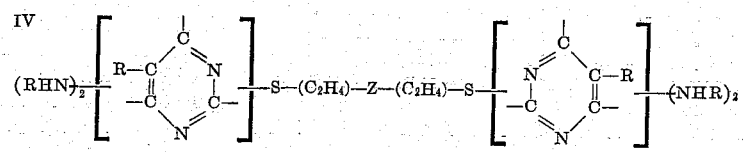

where $n$ (Formula II), R and Z (Formulas II, III and IV) have the same meanings as given above with reference to Formula I.

The compounds embraced by Formula I may be used, for example, as pharmaceuticals, plasticizers, fungicides, bactericides, insecticides, as additives to petroleum products, as an intermediate in the preparation of dyes, drugs, textile assistants and other chemical compounds, for instance as an intermediate in producing derivatives thereof such as ureido, hydrazino, carbamyl, amidine, methylol, methylene, etc., derivatives of the individual compound represented by Formula I. These compounds are especially valuable in the preparation of synthetic resinous compositions. Thus, they may be condensed with, for example, aldehydes, including polymeric aldehydes, hydroxyaldehydes and aldehyde-addition products to yield condensation products having particular utility in the plastics and coating arts. Such condensation products are more fully described and are specifically claimed in our co-pending application Serial No. 461,770, filed October 12, 1942, and assigned to the same assignee as the present invention. These compounds also may be compounded with rubber, both natural and synthetic, to modify the properties of the rubber. For instance, they may be used to accelerate or otherwise facilitate the vulcanization of natural and synthetic rubbers. Instead of using the compounds in the form shown in Formula I, they may be used in the form of their salts in such applications as above mentioned by way of illustration.

Various methods may be employed to produce the chemical compounds embraced by Formula I. We prefer to prepare them by effecting reaction, in the presence of a hydrohalide acceptor, between (1) a mercapto diamino [(—NHR)₂] pyrimidine corresponding to the general formula V 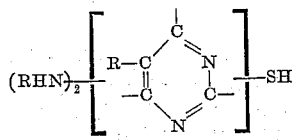

where R has the same meaning as given above with reference to Formula I and (2) a di-(haloalkyl) ether corresponding to the general formula VI      $XC_nR_{2n}—Z—C_nR_{2n}X$ where X represents a halogen atom, and $n$, Z and R have the same meanings as given above with reference to Formula I, the reactants being employed in the ratio of at least two mols of the mercapto diamino pyrimidine of (1) per mol of the di-(haloalkyl) ether of (2). It will be noted that when R in Formula VI represents hydrogen, the compound may be represented by the formula VII      $XC_nH_{2n}—Z—C_nH_{2n}X$ Illustrative examples of mercapto diamino [(—NHR)₂] diazines that may be employed, depending upon the desired end-product, are:

2-mercapto, 4,6 diamino pyrimidine
4-mercapto 2,6-diamino pyrimidine (6-mercapto 2,4-diamino pyrimidine)
2-mercapto 4,6-diamino 5-methyl pyrimidine
4-mercapto 2,6-diamino 5-ethyl pyrimidine
2-mercapto 4,6-diamino 5-phenyl pyrimidine
2-mercapto 4-bromotoluido 6-benzylamino pyrimidine
2-toluido 4-mercapto 6-methylamino pyrimidine
2-mercapto 4-phenylchloroethylamino 6-phenethylamino pyrimidine
2-mercapto 4-chloroanilino 6-phenethylamino pyrimidine
2-mercapto 4-cycloheptylamino 6-isopropylamino pyrimidine
2-mercapto 4,6-di-(methylamino) pyrimidine
2-mercapto 4,6-di-(ethylamino) 5-fluorophenyl pyrimidine
2-mercapto 4,6-di-(fluoroanilino) pyrimidine
2-mercapto 4-methylamino 6-amino pyrimidine
2-mercapto 4-propenylamino 6-amino pyrimidine
2-mercapto 4,6-di-(benzylamino) 5-methyl pyrimidine
2-mercapto 4,6-di-cyclopentylamino) 5-ethyl pyrimidine
2-mercapto 4,6-dianilino pyrimidine
2-mercapto 4,6-ditoluido 5-iodophenyl pyrimidine
2-mercapto 4,6-dixylidino pyrimidine
2-mercapto 4,6-di-(phenethylamino) 5-butyl pyrimidine
2-mercapto 4,6-di-(ethylphenylamino) 5-tolyl pyrimidine
4-mercapto 2,6-di-(methylamino) 5-methyl pyrimidine
2-mercapto 4,6-di-(chloroethylamino) pyrimidine
2-mercapto 4,6-di-(bromoxylidino) 5-chloroethyl pyrimidine
2-mercapto, 4,6-diamino 5-bromotolyl pyrimidine
2-mercapto 4,6-di-(iodoanilino) pyrimidine
2-mercapto 4-allylamino 6-butylamino pyrimidine
4-mercapto 2,6-di-(methylamino) pyrimidine
2-mercapto 4,6-di-(methylamino) 5-methyl pyrimidine
4-mercapto 2,6-di-(methylamino) 5-phenyl pyrimidine
2-mercapto 4-chloroethylamino 6-methylamino pyrimidine
2-mercapto 4,6-dianilino 5-butyl pyrimidine
2-mercapto 4-xenylamino 5-cyclohexenyl 6-amino pyrimidine
2-toluido 4-mercapto 5-cyclopentyl 6-amino pyrimidine
2-mercapto 4,6-di-(propylamino) pyrimidine
2-allylamino 4-mercapto 6-chloroanilino pyrimidine
2-pentylamino 4-mercapto 5-phenyl 6-amino pyrimidine
2-dichloroanilino 4-mercapto 5-tolyl 6-propylamino pyrimidine
2-cycloheptylamino 4-mercapto 6-butylamino pyrimidine
2-mercapto 4-(3'-butenylamino) 6-isopropylamino pyrimidine Illustrative examples of di-(haloalkyl) ethers that may be used, depending upon the particular end-product desired, are:

Di-(chloromethyl) ether
Di-(bromomethyl) ether
Di-(alpha-chloroethyl) ether
Di-(alpha-bromoethyl) ether
Di-(beta-chloroethyl) ether
Di-(beta-bromoethyl) ether
Di-(beta-iodoethyl) ether
Di-(alpha-chloroethyl) thioether
Di-(alpha-bromoethyl) thioether
Di-(beta-chloroethyl) thioether
Di-(beta-bromoethyl) thioether
Chloromethyl beta-chloroethyl ether
Bromomethyl beta-bromoethyl thioether
Di-(beta-chloropropyl) ether
Di-(beta-bromopropyl) ether
Di-(beta-chloropropyl) thioether
Di-(beta-bromopropyl) thioether
Di-(alpha-phenyl beta-bromomethyl) thioether
Di-(alpha-phenyl beta-chloroethyl) ether
Chloromethyl beta-chlorobutyl ether
Chloromethyl beta-chlorobutyl thioether
Di-(alpha-chlorobuten-3-yl) ether
Di-(alpha-bromobuten-3-yl) thioether Various hydrohalide acceptors may be employed. We prefer to use a hydrohalide acceptor that will react with the mercapto pyrimidine to form a water-soluble salt. Examples of such acceptors are the alkali-metal hydroxides, e. g., sodium hydroxide, potassium hydroxide, etc. Additional examples of hydrohalide acceptors that may be used are other inorganic bases, e. g., calcium hydroxide, barium hydroxide, ammonium hydroxide, etc.; carbonates of inorganic bases, including the carbonates of alkali metals; organic amines such as tertiary amines, e. g., trimethyl amine, triethyl amine, tributyl amine, pyridine, dimethyl aniline, quinoline, etc.; quaternary ammonium bases, e. g., tetramethyl ammonium hydroxide, etc.; and the like.

The reaction between the mercapto diamino pyrimidine and the chosen di-(haloalkyl) ether may be carried out in any suitable manner, but preferably is effected in a suitable solvent or mixture of solvents, e. g., water, alcohol, ether, benzene, dioxane, etc. Although various solvents and solvent mixtures may be employed, for economic reasons and because of their eminent suitability we prefer to use water or a mixture of water and alcohol. The reaction may be carried out under a variety of temperature and pressure conditions, for instance at normal, sub-normal or at elevated temperatures and at atmospheric, sub-atmospheric or super-atmospheric pressures. When the reaction is carried out in an aqueous solution it is usually preferable to employ an alkali-metal hydroxide as the hydrohalide acceptor. When a non-aqueous solution constitutes the liquid medium in which the reaction is effected, then it is usually desirable to employ a tertiary amine, e. g., pyridine, as the hydrohalide acceptor.

The above reaction may be represented by the following general equation:

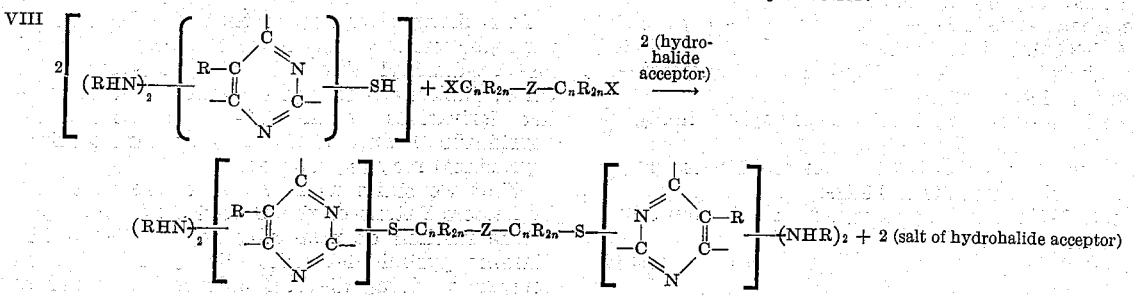

In the above equation X represents a halogen atom, and $n$, R and Z have the same meanings as given above with reference to Formula I.

In order that those skilled in the art better may understand how the present invention may be carried into effect, the following examples are given by way of illustration and not by way of limitation. All parts are by weight.

*Example 1*

This example illustrates the preparation of beta,beta' - bis - (4,6-diamino pyrimidyl-2 thio) diethyl ether, which also may be named bis-[beta - (4,6 - diamino pyrimidyl-2 thio) ethyl] ether.

|  | Parts | Approx. mol ratio |
|---|---|---|
| 2-mercapto 4,6-diamino pyrimidine | 142.0 | 2 |
| Sodium hydroxide in mixture of 500 parts water and 500 parts alcohol | 40.0 | 2 |
| Di-(beta-chloroethyl) ether | 71.5 | 1 |

The first two components were mixed and a clear solution obtained. The di-(beta-chloroethyl) ether was now added and the resulting mixture was heated under reflux at the boiling temperature of the mass for 7 hours. After cooling, the precipitated product comprising beta,beta' - bis - (4,6-diamino pyrimidyl-2 thio) diethyl ether was filtered off, washed well with water to remove soluble salts and dried. A yield of 158 parts of the purified and dried material was obtained. No attempt was made to recover any more product from the mother liquor.

*Example 2*

Beta,beta'-bis-(2,6-diamino pyrimidyl-4 thio) diethyl ether, which also may be named bis-[beta - (2,6 - diamino pyrimidyl-4 thio) ethyl] ether, is prepared in essentially the same manner as described under Example 1 with the exception that 142 parts of 4-mercapto 2,6-diamino pyrimidine are used in place of 142 parts of 2-mercapto 4,6-diamino pyrimidine.

*Example 3*

Beta,beta'-bis-(4,6-diamino pyrimidyl-2 thio) diethyl thioether is prepared in essentially the same manner as described under Example 1 with the exception that 79.5 parts of di-(beta-chloroethyl) thioether are used in place of 71.5 parts of di-(beta-chloroethyl) ether.

*Example 4*

Beta,beta'-bis-(4,6-diamino pyrimidyl-2 thio) ethyl isopropyl ether, which also may be named beta-(4,6-diamino pyrimidyl-2 thio) ethyl, beta-(4,6-diamino pyrimidyl-2 thio) isopropyl ether, is prepared in essentially the same manner as described under Example 1 with the exception that 78.5 parts of beta-chloroethyl beta-chloroisopropyl ether are used instead of 71.5 parts of di-(beta-chloroethyl) ether.

*Example 5*

Beta,beta'-bis-[4,6-di - (methylamino) pyrimidyl-2 thio] diethyl ether is prepared in essentially the same manner as described under Example 1 with the exception that 170 parts of 2-mercapto 4,6-di-(methylamino) pyrimidine are used in place of 142 parts of 2-mercapto 4,6-diamino pyrimidine.

*Example 6*

Beta,beta'-bis-(4,6-diamino pyrimidyl-2 thio) dipropyl ether, which also may be named bis-[beta-(4,6-diamino pyrimidyl-2 thio) propyl] ether, is prepared in essentially the same manner as described under Example 1 with the exception that 85.5 parts of di-(beta-chloropropyl) ether are used in place of 71.5 parts of di-(beta-chloroethyl) ether. Similarly bis - [beta-(4,6 - diamino pyrimidyl-2 thio) isopropyl] ether is prepared by using 85.5 parts of di-(beta-chloroisopropyl) ether instead of 71.5 parts of di-(beta-chloroethyl) ether as in Example 1.

*Example 7*

Beta,beta'-bis-(2,6-diaminopyrimidyl - 4 thio) dipropyl ether and beta,beta'-bis-(2,6-diamino pyrimidyl-4 thio) di-isopropyl ether are prepared in essentially the same manner as described under Example 1 with the exception that 85.5 parts of di-(beta-chloropropyl) ether or of di-(beta-chloroisopropyl) ether are used instead of 71.5 parts of di-(beta-chloroethyl) ether and 142 parts of 4-mercapto 2,6-diamino pyrimidine are used in place of 142 parts of 2-mercapto 4,6-diamino pyrimidine.

Illustrative examples of other compounds embraced by Formula I that may be produced in accordance with the present invention are listed below:

Beta,beta'-bis-[2,6-di-(methylamino) pyrimidyl-4 thio] diethyl ether
Beta,beta'-bis-[4,6-di-(ethylamino) pyrimidyl-2 thio] diethyl ether
Beta,beta'-bis-[4,6-di-(propenylamino) pyrimidyl-2 thio] diethyl ether
Beta,beta'-bis-[4,6-di-(isobutylamino) pyrimidyl-2 thio] diethyl ether
Beta,beta'-bis-(4,6-dianilino pyrimidyl-2 thio) diethyl ether
Beta,beta'-bis-(4,6-dianilino pyrimidyl-2 thio) diethyl thioether
Beta,beta'-bis-[4,6-di-(methylamino) pyrimidyl-2 thio] diethyl thioether
Beta,beta'-bis-(4,6-ditoluido pyrimidyl-2 thio) diethyl ether
Beta,beta'-bis-(4,6-dixylidino pyrimidyl-2 thio) diethyl ether
Beta,beta'-bis-(4,6-ditoluido pyrimidyl-2 thio) diethyl thioether
Beta,beta'-bis-(4,6-diamino 5-methyl pyrimidyl-2 thio) diethyl ether
Beta,beta'-bis-(2,6-diamino 5-ethyl pyrimidyl-4 thio) diethyl thioether
Beta,beta'-bis-[4,6-di-(phenethylamino) pyrimidyl-2 thio] diethyl ether
Beta,beta'-bis-[4,6-di-(ethylanilino) pyrimidyl-2 thio] diethyl ether
Beta,beta'-bis-(4,6-diamino 5-phenyl pyrimidyl-2 thio) diethyl ether
Beta,beta'-bis-[4,6-di-(methylamino) 5-ethyl pyrimidyl-2 thio] diethyl ether
Bis-(4,6-diamino pyrimidyl-2 thio) dimethyl ether
Bis-(2,6-diamino pyrimidyl-4 thio) dimethyl ether
Bis-(4,6-diamino pyrimidyl-2 thio) dimethyl thioether
Bis-(2,6-diamino pyrimidyl-4 thio) dimethyl thioether
Bis-(4,6-diamino 5-methyl pyrimidyl-2 thio) dimethyl ether
Bis-(2,6-diamino 5-phenyl pyrimidyl-4 thio) dimethyl thioether
Bis-[4,6-di-(methylamino) pyrimidyl-2 thio] dimethyl ether
Bis-(4,6-dianilino pyrimidyl-2 thio) dimethyl ether
Bis-(4-methylamino 6-anilino pyrimidyl-2 thio) dimethyl ether
Alpha,beta'-bis-(4,6-diamino pyrimidyl-2 thio) methyl ethyl ether
Alpha, alpha'-bis-(4,6-diamino pyrimidyl-2 thio) diethyl ether
Alpha, alpha'-bis-(2,6-diamino pyrimidyl-4 thio) diethyl ether
Alpha, alpha'-bis-(4,6-diamino pyrimidyl-2 thio) diethyl thioether
Alpha, alpha'-bis-(2,6-diamino pyrimidyl-4 thio) diethyl thioether
Alpha,alpha'-bis-(4,6-diamino pyrimidyl-2 thio) dipropyl ether
Alpha,alpha'-bis-(4,6-diamino pyrimidyl-2 thio) propyl butyl ether
Alpha,beta'-(4,6-diamino pyrimidyl-2 thio) buten-3'-yl butyl ether
Beta,beta'-bis-[4,6-di-(fluoroanilino) pyrimidyl-2 thio] diethyl ether
Beta,beta'-bis-(4,6-diamino 5-chloromethyl pyrimidyl-2 thio) beta,beta'-diphenyl diethyl ether
Alpha,alpha'-bis-[4,6-di-(bromotoluido) pyrimidyl-2 thio] dipropyl ether
Alpha,beta'-bis-(4,6-diamino 5-iodomethyl pyrimidyl-2 thio) diethyl ether
Alpha,beta'-bis-(4-methylamino 6-chloroethylamino pyrimidyl-2 thio) beta-phenyl alpha-ethyl dibutyl thioether
Beta, beta'-bis-[4,6-di-(cyclohexenylamino) pyrimidyl-2 thio] diethyl ether
Beta,beta'-bis-[4,6-di-(allylamino) 5-allyl pyrimidyl-2 thio] dipropylthioether
Beta,beta'-bis-[2,6-di-(naphthylamino) 5-xenyl pyrimidyl-4 thio] diethyl thioether
Beta,beta'-bis-[4,6-di-(octylamino) 5-chlorophenyl pyrimidyl-2 thio] diethyl ether
Beta,beta'-bis-[4,6-di-(chloroanilino) 5-butyl pyrimidyl-2 thio] diethyl thioether
Beta,beta'-bis-[2,6-di-(iodotoluido) 5-iodophenyl pyrimidyl-4 thio] dipropyl ether
Beta,beta'-bis-[4,6-di-(cyclohexylamino) 5-cyclohexyl pyrimidyl-2 thio] diethyl ether In a manner similar to that described above with particular reference to the preparation of bis-(1,3-diazinyl thio), that is, bis-(pyrimidyl thio), dialkyl ethers and thioethers, corresponding derivatives of the 1,2- or ortho-diazines (pyridazines) and of the 1,4- or para-diazines (pyrazines) may be prepared.

What we claim as new and desire to secure by Letters Patent of the United States is:

The method of preparing beta,beta'-bis-(4,6-diamino pyrimidyl-2 thio) diethyl ether which comprises adding di-(beta-chloroethyl) ether to a clear solution obtained by mixing together approximately equal molar ratios of 2-mercapto 4,6-diamino pyrimidine and sodium hydroxide dissolved in a mixture of water and alcohol, the molar amount of di-(beta-chloroethyl) ether being approximately one-half that of the molar amount of 2-mercapto 4,6-diamino pyrimidine, heating the resulting mixture under reflux at the boiling temperature of the mass for a period of the order of 7 hours, filtering off the precipitate comprising beta,beta'-bis-(4,6-diamino pyrimidyl-2 thio) diethyl ether that separates upon cooling the mass, washing the said precipitate with water to remove soluble salts, and drying the washed material.

GAETANO F. D'ALELIO.
JAMES W. UNDERWOOD.